(12) United States Patent
Gever et al.

(10) Patent No.: US 6,313,835 B1
(45) Date of Patent: Nov. 6, 2001

(54) SIMPLIFIED ON-LINE PREPARATION OF DYNAMIC WEB SITES

(75) Inventors: Eyal Gever, Tel Aviv; Doron Gill, Givatayim; Orit Shmaya, Tel Aviv; Oren Zuckerman, Tel Aviv; Orit Bergman, Tel Aviv, all of (IL)

(73) Assignee: Zapa Digital Arts Ltd. (IL)

( * ) Notice: Subject to any disclaimer, the term of this patent is extended or adjusted under 35 U.S.C. 154(b) by 0 days.

(21) Appl. No.: 09/289,689

(22) Filed: Apr. 9, 1999

(51) Int. Cl.⁷ ................................................... G06F 3/14
(52) U.S. Cl. ........................ 345/357; 345/329; 345/339; 345/356; 707/513
(58) Field of Search ................................. 345/356, 357, 345/339, 329

(56) References Cited

U.S. PATENT DOCUMENTS

| | | | |
|---|---|---|---|
| 5,517,605 | 5/1996 | Wolf | 707/104 |
| 5,659,729 | 8/1997 | Nielsen | 707/3 |
| 5,764,241 * | 6/1998 | Elliott et al. | 345/473 |
| 5,802,530 * | 9/1998 | Hoff | 707/513 |
| 5,870,550 * | 2/1999 | Wesinger, Jr. et al. | 709/218 |
| 5,937,417 * | 8/1999 | Nielsen | 707/513 |
| 5,956,736 * | 9/1999 | Hanson et al. | 707/513 |
| 5,983,190 * | 11/1999 | Trower, II et al. | 704/276 |
| 6,012,071 * | 1/2000 | Krishna et al. | 707/522 |
| 6,031,989 * | 2/2000 | Cordell | 395/701 |
| 6,035,119 * | 3/2000 | Massena et al. | 395/701 |
| 6,081,278 * | 6/2000 | Chen | 345/473 |
| 6,088,042 * | 7/2000 | Handelman et al. | 345/473 |

FOREIGN PATENT DOCUMENTS 9735280   9/1997 (WO) .

OTHER PUBLICATIONS

Darcy Dinucci et al.; Elements of Web Design, 1998, 150–167.*
U.S. Pat. Application No. 08/819,607.
U.S. Pat. Application No. 08/121,062.

* cited by examiner

Primary Examiner—Raymond J. Bayerl
Assistant Examiner—Thomas T. Nguyen
(74) Attorney, Agent, or Firm—Ostrolenk, Faber, Gerb & Soffen (57) ABSTRACT

A method for creating a Web page component, including opening a remote connection to a server provided with a plurality of basic animation sequences having variable attributes associated therewith, and choosing, via the connection, at least one of the basic animation sequences. One or more of the variable attributes of the chosen animation sequence are changed, and a Web page is posted which includes the animation sequence with the changed attributes.

43 Claims, 9 Drawing Sheets

SIMPLIFIED ON-LINE PREPARATION OF
DYNAMIC WEB SITES

FIELD OF THE INVENTION

The present invention relates generally to preparation of Web home pages and components to be used thereon, and specifically to simplified on-line preparation of such home pages and components.

BACKGROUND OF THE INVENTION

In recent years, the use of the World Wide Web (WWW) has been rapidly growing. In use of the Web, a client computer user connects to a Web site on a server and requests that the server download and display Web pages on the client computer. In response to the request, the server sends to the client computer graphic files, usually in Hyper-text Mark-up Language (HTML), which include media elements (pictures, animations, texts, sound), scripts of instructions to be performed by an Internet browser program running on the computer, and in some cases executable software code, e.g., Java code.

The number of companies, organizations and individuals who have Web home pages is rapidly growing. Companies feel the need to prepare interesting Web sites and Web advertisements in order to attract customers and maintain their standing in the market. Furthermore, many individuals prepare Web pages to convey information in graphical and/or animation formats to their friends and family.

Existing tools for preparing Web pages, such as Dreamweaver, produced by Macromedia, are relatively complex. A small company, organization or home user does not need such tools and in many cases does not know how to take advantage of their sophisticated features. There are on-line services for preparing Web pages, such as the GeoBuilder program offered by Geocities. Other Web sites include programs that aid users in adding features to their Web pages. However, these sites offer the user only limited flexibility, and do not generally support sophisticated features such as Java-based animation.

On-line greeting card companies allow users to select a greeting card and add and/or change text inscriptions associated with the card. Some of these greeting cards include animation sequences, but the animation sequences are generally fixed and cannot be substantially altered by the user.

The above-mentioned Geocities Web site allows a user to prepare a Web page component which includes animation. However, in order to prepare such Web page components and in order to view such components, normal HTML and Java tools are not sufficient, and the user must download a proprietary software client.

Web page components may be programmed to respond differently to different users and/or at different times. For example, an Internet banner prepared by Doubleclick for inclusion in a Web page selects different advertisements to display according to input received from or about a user viewing the Web page, indicative of the user's interests or demographic factors. As another example, the IBM Patent Server Web page, allows a user to subscribe to a patent service and receive the service between certain selected hours on the user's local time.

SUMMARY OF THE INVENTION

It is an object of some aspects of the present invention to provide improved methods and apparatus for simplified generation of Web page components which include animation.

It is another object of some aspects of the present invention to provide improved methods and apparatus for simplified generation of Web page components which respond differently at different times.

It is still another object of some aspects of the present invention to provide improved methods and apparatus for simplified generation of Web page components which respond differently to different users.

In preferred embodiments of the present invention, a server provides a Web site to which a user connects in order to create one or more individualized Web page components. To create such components, the user selects from a plurality of basic animation sequences one or more animation sequence to be displayed on the Web page. Preferably, the user is able to change at least some of the attributes of the selected animation sequence, such as the colors, texts, fonts, characters, borders, sounds, embedded pictures and models. A Web page including the one or more selected animation sequences is then posted at a Web address chosen by or allocated to the user.

In some preferred embodiments of the present invention, the user manipulates the animation sequence by removing and/or repeating scenes or frames of the sequence. Alternatively or additionally, the user adds conditional flow directives to the sequence.

In some preferred embodiments of the present invention, the user assigns conditional values to the attributes of the animation sequence. For example, the user may create a Web page component based on an animation sequence which includes a character (i.e., an animated figure) and may change the character to a conditional character. When a visitor views the Web page, the character actually displayed in place of the conditional character is chosen according to data pertaining to the visitor received by the server on which the Web page is maintained.

In some preferred embodiments of the present invention, the Web site enables the user to create a dynamic Web page component which reacts differently, i.e., which presents a different display to visitors connecting thereto, according to a predetermined scheme. Preferably, the user selects a plurality of Web page components and for each Web page component states a condition that must be fulfilled in order for the particular Web page component to be displayed. Preferably, the Web page components are assigned priorities which determine, for example, which component is displayed when more than one condition is fulfilled, or which component is displayed as a default when none of the conditions is fulfilled. Preferably, the predetermined scheme depends on information pertaining to the visitor, information pertaining to other visitors, or to other unrelated information received by the server on which the Web page component is maintained.

In some preferred embodiments of the present invention, the created Web page component includes a default component and other components which are directed to specific users who identify themselves as belonging to a list of visitors defined by the user. Thus, the user is able to use the components to post messages on the Web page to specific visitors on the list.

In some preferred embodiments of the present invention, the Web site allows the user to create a dynamic Web page component, which is displayed differently to visitors at different times. Preferably, the Web site responds according to the time of day at the geographic location of the visitor. Alternatively, the Web site responds according to the time of day at the geographic location of the user who created the page. Further alternatively or additionally, the Web site responds according to the day of week, date, month, season and/or year. For example, a user may create a family photo album with a background in accordance with the time or season at which the visitor visits the site.

In other preferred embodiments of the present invention, the dynamic Web page component responds differently according to the total number of visits to the Web page on which it resides, or according to the number of visits by a specific visitor.

Preferably, the user is able to access the Web site without use of a special software client. Further preferably, the created Web page component which includes the animation sequence does not require the use of any special software client for viewing. Rather, the component is based on standard HTML and Java programs.

There is therefore provided, in accordance with a preferred embodiment of the present invention, a method for creating a Web page component, including:

opening a remote connection to a server provided with a plurality of basic animation sequences having variable attributes associated therewith;

choosing, via the connection, at least one of the basic animation sequences to be used in the Web page component;

changing one or more of the variable attributes of the chosen animation sequence; and posting the Web page component including the animation sequence with the changed attributes to a Web page.

Preferably, opening the remote connection includes opening a connection over the Internet.

In a preferred embodiment, choosing the at least one animation sequence includes choosing an animation sequence which substantially covers an entire Web page.

Preferably, changing one or more of the attributes of the animation sequence includes inserting data into the animation sequence. Preferably inserting data into the animation sequence includes inserting images or, alternatively or additionally, inserting hypertext links.

Preferably, changing one or more of the attributes of the animation sequence includes changing a color setting in the animation sequence and/or changing a character which appears in the animation sequence.

In a preferred embodiment, the animation sequence includes a plurality of frames in a predetermined order and changing one or more of the attributes includes manipulating the frames in the sequence. Preferably, manipulating the frames in the sequence includes deleting one or more frames from the animation sequence or, alternatively or additionally, repeating one or more frames in the animation sequence.

In another preferred embodiment, changing one or more of the attributes of the animation sequence includes assigning to at least one of the one or more attributes a plurality of values which are respectively chosen responsive to a condition evaluated when the Web page component is viewed. Preferably, changing one or more of the attributes of the animation sequence includes adding conditional flow directives to the animation sequence.

Preferably, posting the Web page component includes posting a link to the animation sequence, wherein posting the Web page component includes posting a list of the changes performed on the animation sequence.

Further preferably, posting the Web page component includes posting a Web page component which does not require any proprietary software in order to be viewed by a viewer, and changing the one or more attributes does not require use of any proprietary software.

There is also provided, in accordance with a preferred embodiment of the present invention, a method for creating a Web page component, including:

providing a plurality of basic animation sequences on a server, the sequences having variable attributes associated therewith;

receiving from a remote processor a selection of at least one of the basic animation sequences to be used in the Web page component;

changing one or more of the attributes of the chosen animation sequence responsive to a command received from the remote processor; and posting the Web page component including the animation sequence with the changed attributes to a Web page.

In a preferred embodiment, providing the plurality of basic animation sequences includes receiving an animation template uploaded to the server by a user.

Preferably, changing one or more of the attributes includes inserting data into the sequence. Alternatively or additionally, changing one or more of the attributes of the animation sequence includes changing a color setting in the animation sequence.

In a preferred embodiment, the animation sequence includes a plurality of frames in a predetermined order and wherein changing one or more of the attributes includes manipulating the frames in the sequence.

In another preferred embodiment, changing one or more of the attributes of the animation sequence includes assigning to at least one of the one or more attributes a plurality of values which are respectively chosen responsive to a condition evaluated when the Web page component is viewed. Preferably, changing one or more of the attributes includes adding conditional flow directives to the animation sequence.

Preferably, posting the Web page component includes posting a link to the animation sequence. Most preferably, posting the Web page component includes posting a list of the changes performed on the animation sequence.

Further preferably, posting the Web page component includes posting a Web page component which does not require any proprietary software in order to be viewed by a viewer, and changing the one or more parameters does not require installing any proprietary software on the processor.

There is further provided, in accordance with a preferred embodiment of the present invention, a method for creating a dynamic Web page component on a server which presents a plurality of different Web page component displays at different visits to a page containing the component by visitors connecting to the server, including:

generating representations of the plurality of different displays;

receiving from a remote processor a dynamic scheme for presenting the displays differently at different visits to the page containing the component by the visitors; and presenting the displays to the visitors responsive to the dynamic scheme.

Preferably, generating the representations includes generating a script which creates the display.

Alternatively or additionally, generating the representations includes receiving a link to a Web page which contains the display, wherein generating the representations preferably includes generating a list of changes to the Web page component referenced by the link.

Preferably, generating the representations includes creating at least one of the representations interactively responsive to commands from a user of the remote processor.

Alternatively or additionally, generating the representations includes importing at least one of the representations from the remote processor.

Preferably, receiving the scheme from the remote processor includes receiving a scheme over the Internet.

In a preferred embodiment, receiving the scheme includes receiving a scheme including a condition associated with each of the plurality of displays. Preferably, receiving the scheme includes setting an order of precedence for the plurality of displays, and further includes setting a default display. Preferably, receiving the scheme includes receiving a scheme which depends on the time at which the dynamic page component is viewed and/or on the number of times the dynamic page component was viewed and/or on data related to one of the visitors who view the dynamic page component.

There is additionally provided, in accordance with a preferred embodiment of the present invention, apparatus for creating a Web page component, including:

a server which displays a plurality of basic animation sequences, and allows a user of a remote processor to select at least one basic animation sequence and change one or more attributes of the sequence; and a communication interface which receives a connection from the remote processor to the server, whereby the user thereof selects the sequence.

In a preferred embodiment, the at least one basic animation sequence covers an entire Web page.

Preferably, the one or more attributes include colors associated with the sequence.

Further preferably, the server allows addition of data into the sequence by the user.

In a preferred embodiment, the animation sequence includes a plurality of frames, and the server allows the user to manipulate the frames. Preferably, the server allows the user to delete frames and/or to duplicate frames.

In another preferred embodiment, the server assigns a plurality of values to the one or more attributes together with a scheme which determines which of the values is to be used each time the Web page component is displayed.

Preferably, the server adds a conditional flow directive to the sequence responsive to a command from the user.

Preferably, the server allows the user to select and change the sequence using substantially only non-proprietary software.

There is moreover provided, in accordance with a preferred embodiment of the present invention, apparatus for creating a dynamic Web page component, including:

a server which generates a plurality of representations of different displays; and a communication interface which receives a connection from a remote processor to the server and allows the user of the remote processor to determine a dynamic scheme for presenting the displays differently at different visits to a Web page that includes the component.

Preferably, the plurality of representations include scripts which generate the display.

Further preferably, at least one of the representations includes a link to a Web page on an external server, wherein the representation most preferably includes a list of changes to the Web page component on the external server.

Preferably, the server generates the representations responsive to commands from the remote processor.

In a preferred embodiment, the dynamic scheme includes a respective condition for selecting each of the different displays. Preferably, the dynamic scheme includes a an order of precedence of the different displays. Alternatively or additionally the dynamic scheme depends on the time of a visit to the page that includes the component and/or on the identity of a visitor viewing the page.

There is also provided, in accordance with a preferred embodiment of the present invention, a software package for creating Web page components, including an executable file which is run by a server to display on a Web page a selected basic animation sequence from among a plurality of basic animation sequences having variable attributes associated therewith, responsive to selection of the sequence by a remote user, and which allows the remote user to change one or more of the variable attributes of the selected sequence.

Preferably, the variable attributes include one or more attributes selected from a group of attributes that includes colors, characters, pictures, texts, links, and sound files.

Further preferably, the software package includes a plurality of data files which include data representative of the basic animation sequences, wherein the executable file performs changes to the animation sequence by changing a copy of a respective one of the data files. In a preferred embodiment, the executable file performs changes to the animation sequence by associating a list of changes with a pointer to a respective one of the data files.

There is additionally provided, in accordance with a preferred embodiment of the present invention, a Web site, including:

a display of a plurality of basic animation sequences having variable attributes associated therewith; and an interface for receiving a selection of one of the animation sequences and for performing changes to the selected animation sequence.

There is further provided, in accordance with a preferred embodiment of the present invention, a software package for creating Web page components, including an executable file which is run by a server to display an interface, which receives from a user data representative of each of a plurality of different displays of a Web page component, and which receives from the user a scheme for determining which of the different displays is to be displayed upon each visit to a Web page including the component by visitors connecting to the page.

There is also provided, in accordance with a preferred embodiment of the present invention, a Web site, including an interface for receiving data representative of each of a plurality of different displays of a Web page component, and for receiving a scheme for determining which of the different displays is to be displayed upon each visit to a Web page including the component by visitors connecting to the page.

There is additionally provided, in accordance with a preferred embodiment of the present invention, a method for creating an animation template for generating a computer animation, including:

downloading a basic animation template from a server via a network, the basic template including one or more placeholders corresponding to respective fields in a database, such that an animation is generated responsive to the template including objects stored in the database;

modifying the basic template to generate a new animation template including the placeholders so as to produce a computer animation having a substantially different graphic appearance from that of the basic template; and uploading the new template to the server, so that the new template is accessible to a client of the server.

Preferably, the client selects the new template and changes one or more attributes thereof to produce an animation sequence to be posted to a Web page.

There is furthermore provided, in accordance with a preferred embodiment of the present invention, a software package for creating an animation template, including an executable file which is run by a client computer to download a basic animation template from a server via a network, the basic template including one or more placeholders corresponding to respective fields in a database, such that an animation is generated responsive to the template including objects stored in the database, and to modify the basic template to generate a new animation template including the placeholders so as to produce a computer animation having a substantially different graphic appearance from that of the basic template.

Preferably, the new template is uploaded to the server, where it is accessible to other clients who select the new template and change one or more attributes thereof to produce an animation sequence to be posted to a Web page.

The present invention will be more fully understood from the following detailed description of the preferred embodiments thereof, taken together with the drawings in which:

DETAILED DESCRIPTION OF PREFERRED EMBODIMENTS

Figure 1:
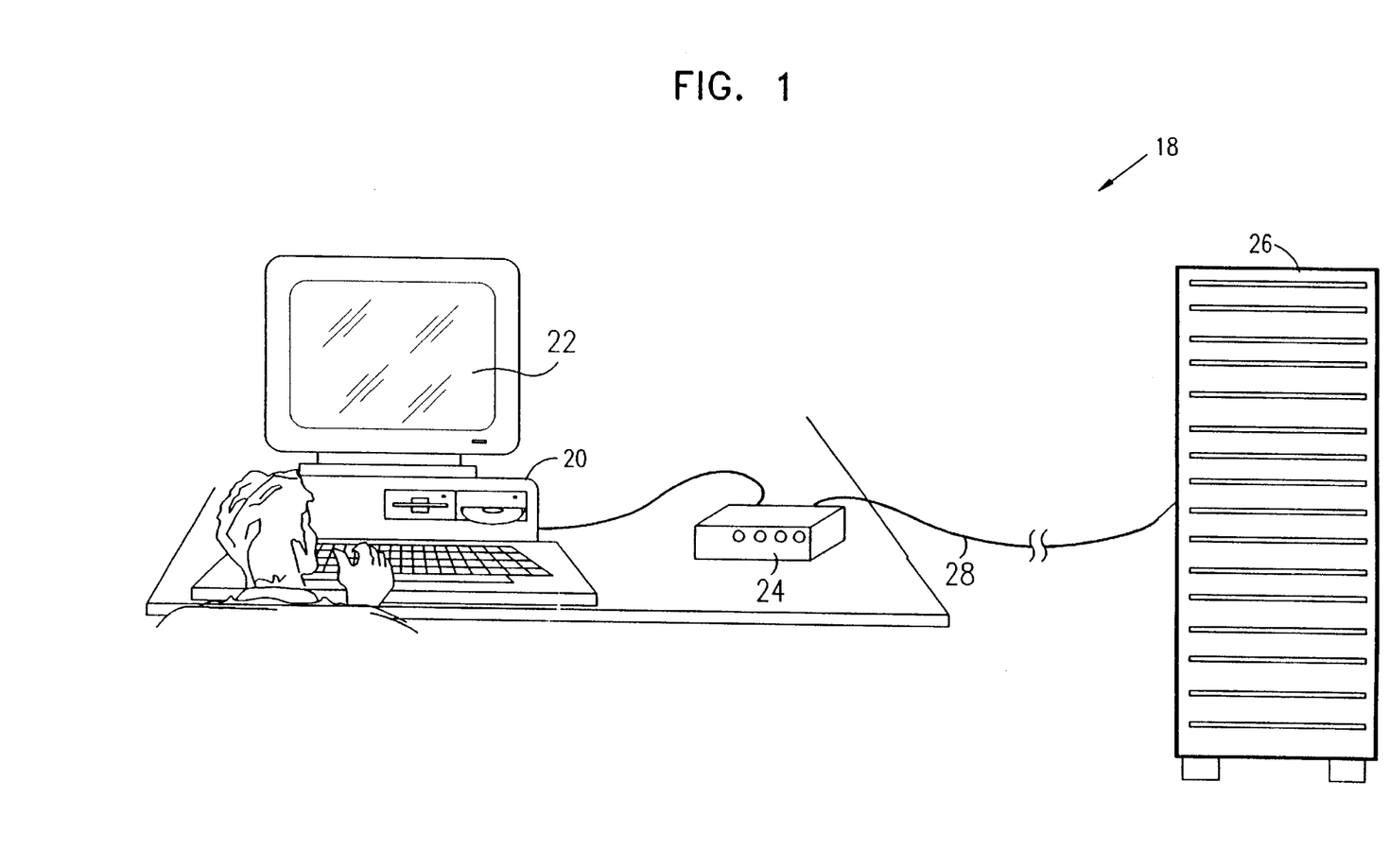
FIG. 1 is a schematic illustration of a system for creation of a Web page, in accordance with a preferred embodiment of the present invention.

FIG. 1 is a schematic illustration of a system 18 for creating Web page components, in accordance with a preferred embodiment of the present invention. A server 26, preferably a Web server, as is known in the art, hosts a Web site for creating the Web page components, which may also be used to create entire Web pages. A user uses a processor 20 to connect, for example using a modem 24, to server 26 via a network 28, preferably via the Internet. Processor 20 is preferably coupled to a display 22 on which the Web site of server 26 is displayed. Using the Web site, the user creates a Web page component as described hereinbelow. During the creation of the Web page component, the description of the Web page is stored in a work-area allocated to the user on a memory associated with server 26.

Figure 2:
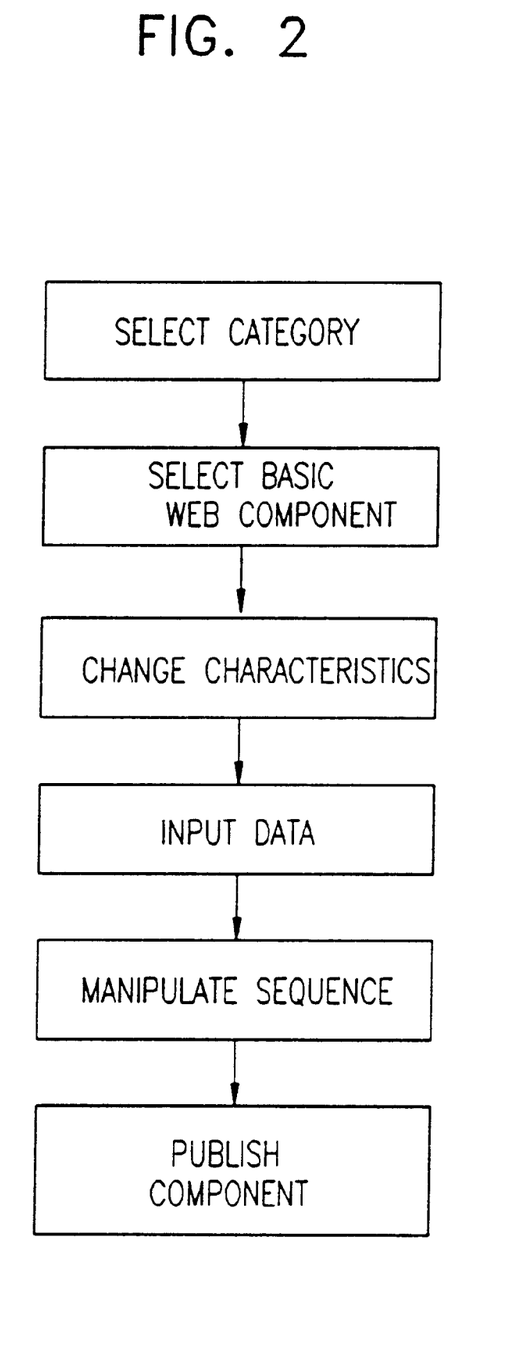
FIG. 2 is a flow chart that schematically illustrates a method for preparing a Web-page component, in accordance with a preferred embodiment of the present invention.

FIG. 2 is a flow chart which schematically illustrates actions taken by the user of processor 20 in preparing the Web page component, in accordance with a preferred embodiment of the present invention. The Web site of server 26 displays a list of categories from which the user may select for inclusion in the Web page. The categories may include, for example, photo albums, advertisements, greeting cards, and resumes. Alternatively or additionally, the categories may be defined according to any other classification. According to the selected category, the user is provided with a list of titles of basic animation sequences. Each of the animation sequences is generated by a respective script, preferably written in the JavaScript language, or as an executable Java program, which is stored on server 26. The user may preview any of the animation sequences on display 22 in order to select an animation sequence which forms a basis of the Web page to be created for the user.

Preferably, the script describing the selected animation sequence is copied to a work area on server 26 that is assigned to the user. Alternatively or additionally, a link is placed in the work area referring to the script, and there is no need to produce an additional copy of the script.

Preferably, the user is able to change attributes of the selected animation sequence, such as colors and choice of images. Further preferably, the user enters data, such as text, hypertext links, and pictures, to the animation sequence at locations assigned in the sequence for receiving the data. Alternatively or additionally, the user may manipulate the animation sequence, by removing or repeating one or more frames or scenes of the sequence. One preferred method of performing these changes to the animation sequence is described hereinbelow with reference to FIGS. 3, 4, 5, and 6.

Preferably, the revised animation sequence is assigned a URL address and is posted on a network server, either server 26 or a different Internet server. The assigned URL address can then be incorporated inside another Web site as a link or, preferably, another URL address may be used to incorporate the animation sequence in another Web page, either in an open or hidden incorporation scheme. Alternatively or additionally, the animation sequence is assigned an identification name, which is used to incorporate the sequence as a dynamic Web page component, as described further hereinbelow. Further alternatively or additionally, the script describing the animation sequence is downloaded to processor 20.

Preferably, the user is able to select one or more such animation sequences and paste them onto a Web page assigned to the user. Changes to the sequences, if needed, are preferably performed by returning to the Web site on server 26. The user creates other parts of the Web page in accordance with on-line or off-line methods known in the art.

It is noted that although the above description refers to an animation sequence which is used as a component of a Web page, the present invention can also be adapted for building entire Web pages.

Figure 3:
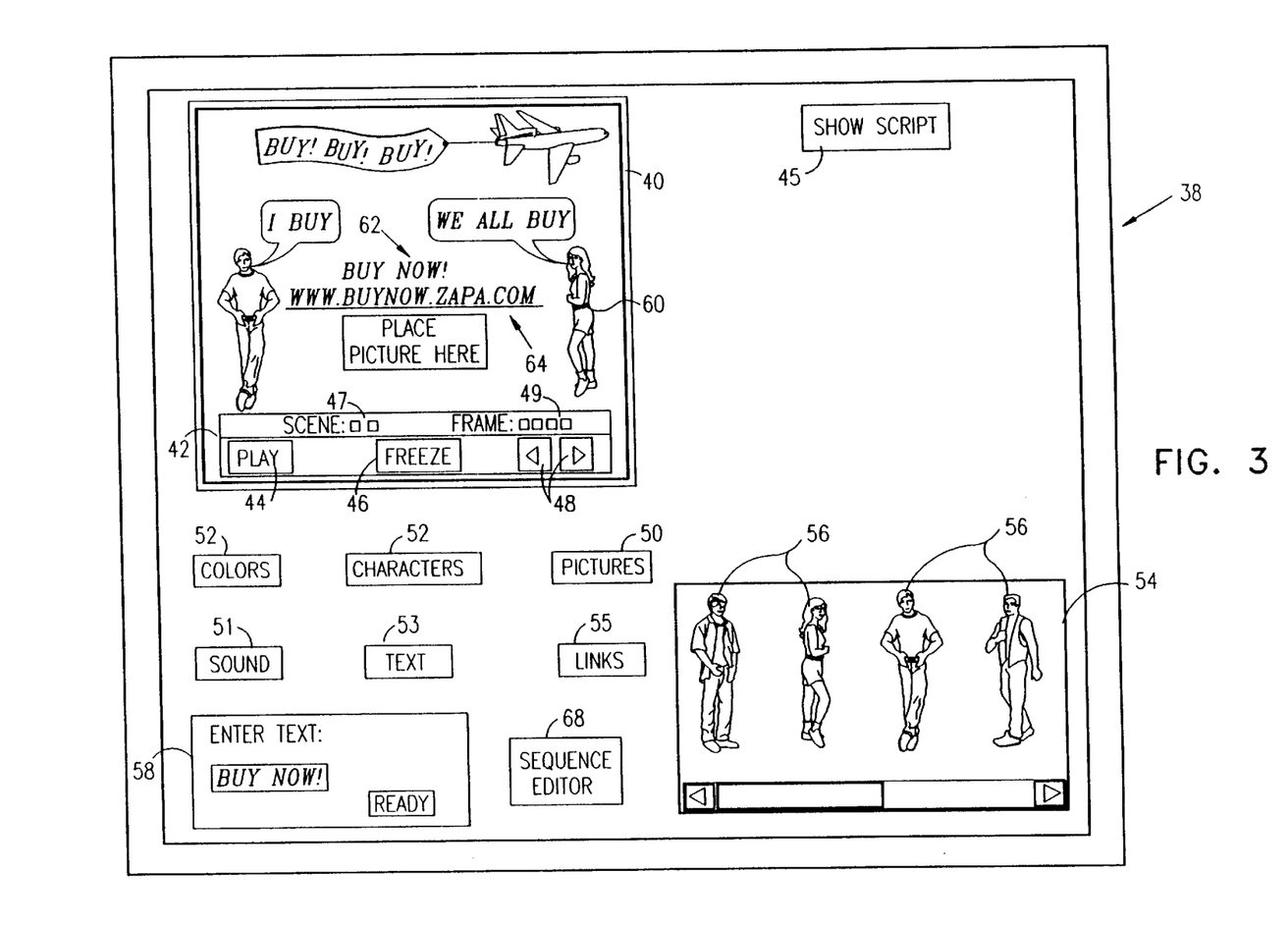
FIG. 3 is a schematic view of an animation editing window, in accordance with a preferred embodiment of the present invention.

FIG. 3 is a schematic view of an animation editing window 38 shown on display 22, in accordance with a preferred embodiment of the present invention. Editing window 38 comprises a display window 40 in which the selected animation sequence is displayed. A control panel 42 preferably comprises a play control 44; a freeze control 46, which allows a user to stop the sequence on a specific frame; and direction icons 48, which allow the user to scan the animation sequence. Alternatively or additionally, control panel 42 includes other suitable controls, such as a frame counter 49 and/or a scene counter 47.

Window 38 preferably comprises a plurality of image attribute controls 52, which allow the user to change attributes of images shown in the animation sequence. The user preferably changes the attributes by selecting from a predefined group of replacements available from server 26. For example, in order to change a character 60 seen in the animation, the user selects the character, typically using a mouse or other pointing device, and actuates the appropriate control 52. A pop-up window 54 displays a plurality of characters from which the user may select a replacement for character 60. Preferably, the user is also able to change attributes of the selected character 56, such as the behavior of the character. Such behaviors are described, for example, in U.S. patent application Ser. No. 08/819,607, which is assigned to the assignee of the present patent application and is incorporated herein by reference, and in a corresponding PCT patent application published as WO97/35280. Likewise, the user may change border widths and colors of objects and of background regions in the animation sequence. Alternatively or additionally, window 38 allows changing of any other suitable attributes, such as the fonts and sizes of letters and background patterns.

Preferably, the changes made in the animation are stored by modifying the script associated with the created page. Alternatively, the reference to the script is accompanied by a list of changes to be made in the script, and the list is taken into account when displaying the page. Preferably, a script control 45 allows the user to request to see the script corresponding to the animation sequence.

Window 38 preferably includes additional controls 50, 51, 53 and 55, which are used to enter data to be associated with the animation sequence. For example, the user selects a text field 62 in display window 40 and actuates the text control 53. In response, a pop-up window 58 preferably opens, in which the user may enter a replacement text to display in field 62. Likewise, the user may select a link address 64 in the display window, and using "links" control 55, along with a respective entry window, may change the address of the link.

Picture control 50 is similarly used to enter pictures into the animation sequence. Preferably, the user may import pictures which are represented in substantially any standard format. The picture is passed to server 26, where it is converted if necessary into a standard format suitable for use in the animation sequence, and the description in the standard format is stored in the location allocated for the created Web page component. Further preferably, when a viewer views the page, the picture is passed to the viewer in a format most suitable for the user and at a size and resolution chosen such that the picture can be transmitted and viewed even over slow network connections in a reasonable amount of time.

In a similar manner, the user is preferably able to change sound segments included in the animation sequence, using control 51. Preferably, sound files received from the user are passed to server 26, where they are stored in conjunction with the pictures, text and list of changes.

In some preferred embodiments of the present invention, the above-described changes and data input may be made dependent upon a predefined condition. Thus, the user may, for example, choose to replace character 60 by a male character which is displayed when the animation sequence is viewed by a female visitor, and by a female character which is displayed to male visitors. Preferably, the condition is entered using the condition editor described hereinbelow.

Preferably, editing-window 38 further includes a sequence control 68, which invokes a sequence editor for controlling the length and flow of the animation sequence, as described hereinbelow.

In an alternative preferred embodiment, not shown in the figures, a "Wizard" guides the user through the initial creation of the animation sequence. Such a Wizard presents the user with a series of guided questions and choices, as are known in the art, so that the animation sequence is initially created without the need for the user to use the interface tools and controls of window 38. Thereafter, the user can make changes to the sequence using window 38, if desired.

Table I below is an XML file, as is known in the art, defining the properties of Web page components to be created on-line by a user of the Web site described hereinabove, and then the implementation of these properties using specified HTML and JavaScript instructions which build up the animation sequence. The animation is carried out using a suitable Java player, which is downloaded implicitly to the computer of a visitor viewing the animation sequence. Further details regarding implementation of such a Java player are described in the above-mentioned U.S. patent application Ser. No. 08/819,607 and in U.S. patent application Ser. No. 09/121,062, which are assigned to the assignee of the present patent application and incorporated herein by reference. In the example given in Table I, the user creates an on-line "photo album," including animation effects, using editing window 38 or, most preferably, guided by the Wizard mentioned above.

The value of the parameter "hidden" with respect to each of the properties or property groups indicates whether the property is assigned by the system, i.e., automatically by the Web site, in which case hidden=1, or whether it is to be modified by the user by means of the Wizard, in which case hidden=0. For example, the property "baby's first name" in the seventh line of the table is a placeholder for the first name of a baby shown in an image, which is also incorporated in the photo album. The table indicates that the name, to be entered by the user, is a text string of up to 15 characters. An image of the baby is introduced by the property "current image." Similarly, the user can modify animations and sounds associated with the image by changing the "current animation" and "current sound" properties. As shown in the table, a number of different images and animation sequences can be incorporated in this manner.

TABLE I

```
<?xml version="1.0"?>
<Component ID="1"customization="step0.asp">
    <Properties>
        <PropertyGroup name="step0" hidden="0">
            <PropertyGroup name="Text" hidden="0 ">
                <SharedProperty name="first_name"
displayname="baby's first name" type="String" value="First
name" hidden="0" length="15"/>
                <SharedProperty name="family_name"
displayname="baby's last name" type="String" value="Last
name" hidden="0" length="15"/>
            </PropertyGroup>
        </PropertyGroup>
        <PropertyGroup name="step1" hidden="0">
            <SharedProperty name="p1" displayname="Current
image" type="Image" value="baby_maya.gif" hidden="0"
width="200" height="200"/>
            <SharedProperty name="animl"
displayname="Current animation" type="Animation"
```

TABLE I-continued value="Fairy_flip.gif" hidden="0" width="60" height="60"/>
        <SharedProperty name="Click_sound"
displayname="Current sound" type="Sound" value="cameral.au"
hidden="0"/>
        <SharedProperty name="Ad_image_albumz"
displayname="Ad image_albumz" type="Image"
value="Ad_image_albumz.gif" hidden="1" width="176"
height="31"/>
        <SharedProperty name="Zapa_logo"
displayname="Zapa_logo" type="Image" value="zapa_logo.gif"
hidden="1" width="72" height="33"/>
        <PropertyGroup name="Text" hidden="0">
            <SharedProperty name="tl_1"
displayname="Picture 1 text" type="String" value="This text"
hidden="0" length="18"/>
                <SharedProperty name="tl_2" displayname=" "
type="String" value="goes along" hidden="0" length="18"/>
                <SharedProperty name="tl_3" displayname=" "
type="String" value="with your" hidden="0" length="18"/>
                <SharedProperty name="tl_4" displayname=" "
type="String" value="picture" hidden="0" length="18"/>
                <SharedProperty name="tl_5" displayname=" "
type="String" value=" " hidden="0" length="18"/>
                <SharedProperty name="tl_6_" displayname=" "
type="String" value=" " hidden="0" length="18"/>
            </PropertyGroup>
        </PropertyGroup>
        <PropertyGroup name="step2" hidden="0">
            <SharedProperty name="p2" displayname="Current
image" type="Image" value="200.gif" hidden="0" width="200"
height="200"/>
            <PropertyGroup name="Text" hidden="0">
                <SharedProperty name="t2_1"
displayname="Picture 2 text" type="String" value="This text"
hidden="0" length="18"/>
                <SharedProperty name="t2_2" displayname=" "
type="String" value="goes along" hidden="0" length="18"/>
                <SharedProperty name="t2_3" displayname=" "
type="String" value="with your" hidden="0" length="18"/>
                <SharedProperty name="t2_4" displayname=" "
type="String" value="picture" hidden="0" length="18"/>
                <SharedProperty name="t2_5" displayname=" "
type="String" value=" " hidden="0" length="18"/>
                <SharedProperty name="t2_6" displayname=" "
type="String" value=" " hidden="0" length="18"/>
            </PropertyGroup>
        </PropertyGroup>
        <PropertyGroup name="step3" hidden="0">
            <SharedProperty name="p3" displayname="p3"
type="Image" value="200.gif" hidden="0" width="200"
height="200"/>
            <SharedProperty name="anim3"
displayname="Current animation" type="Animation"
value="output.gif" hidden="0" width="60" height="60"/>
            <PropertyGroup name="Text" hidden="0">
                <Sharedproperty name="t3_1"
displayname="Picture 3 text" type="String" value="This text"
hidden="0" length="18"/>
                <SharedProperty name="t3_2" displayname=" "
type="String" value="goes along" hidden="0" length="18"/>
                <SharedProperty name="t3_3"displayname=" "
type="String" value="with your" hidden="0" length="18"/>
                <SharedProperty name="t3_4"displayname=" "
type="String" value="picture" hidden="0" length="18"/>
                <SharedProperty name="t3_5" displayname=" "
type="String" value=" " hidden="0" length="18"/>
                <SharedProperty name="t3_6" displayname=" "
type="String" value=" " hidden="0" length="18"/>
            </PropertyGroup>
        </PropertyGroup>
        <PropertyGroup name="step4" hidden="0">
            <SharedProperty name="p4"displayname="Current
image" type="Image" value="200.gif" hidden="0" width="200"
height="200"/>
            <PropertyGroup name="Text" hidden="0">
                <SharedProperty name="t4_1"
displayname="Picture 4 text" type="String" value="This text"
hidden="0" length="18"/>
                <SharedProperty name="t4_2" displayname=" "

type="String" value="goes along" hidden="0" length="18">
                <SharedProperty name="t4_3"displayname=" "
type="String" value="with your" hidden="0" length="18"/>
                <SharedProperty name="t4_4"displayname=" "
type="String" value="picture" hidden="0" length="18"/>
                <SharedProperty name="t4_5"displayname=" "
type="String" value=" " hidden="0" length="18"/>
                <SharedProperty name="t4_6"displayname=" "
type="String" value=" " hidden="0" length="18"/>
            </PropertyGroup>
        </PropertyGroup>
        <PropertyGroup name="step5" hidden="0">
            <SharedProperty name="p5" displayname="Current
image" type="Image" value="200.gif" hidden="0" width="200"
height="200"/>
            <SharedProperty name="anim5"
displayname="Current animation" type="Animation"
value="Elephant_2.gif" hidden="0" width="60" height="60"/>
            <PropertyGroup name="Text" hidden="0">
                <SharedProperty name="t5_1"
displayname="Picture 5 text" type="String" value="This text"
hidden="0" length="8"/>
                <SharedProperty name="t5_2" displayname=" "
type="String value="goes along"hidden="0"length="19"/>
                <SharedProperty name=" t5_3"displayname=" "
type="String" value="with your" hidden="0" length="18"/>
                <SharedProperty name="t5_4" displayname=" "
type="String" value="picture" hidden="0" length="18"/>
                <SharedProperty name="t5_5" displayname=" "
type="String" value=" " hidden="0" length="18"/>
                <SharedProperty name="t5_6" displayname=" "
type="String" value=" " hidden="0" length="18"/>
            </PropertyGroup>
        </PropertyGroup>
        <PropertyGroup name="step6" hidden="0">
            <PropertyGroup name="Text" hidden="0">
                <SharedProperty name="user_name"
displayname="Your name" type="String" value="Your name"
hidden="0" length="25"/>
                <SharedProperty name="personal_text1"
displayname="Your personal text" type="String" value="I made
this myself!" hidden="0" length="35"/>
                <SharedProperty name="personal_text2"
displayname=" " type="String" value="Make your own at
zapa.com" hidden="0" length="35"/>
                <SharedProperty name="user_email"
displayname="Your email" type="String"
value="support@zapa.com" hidden="0 " length="25"/>
            </PropertyGroup>
        </PropertyGroup>
    </Properties>
    <Implementations>
        <Variation name="var1">
            <Implementation type="General">
                <File source="Wrapper.js"/>
                <File source="Wrapper.htm"/>
                <File source="publish"/>
                <File source="gizmo.htm"/>
                <File source="preview.htm"/>
            </Implementation>
            <Implementation type="MS">
                <File source="params txt"/>
            </Implementation>
        </Variation>
    </Implementations>
</Component>

Figure 4:
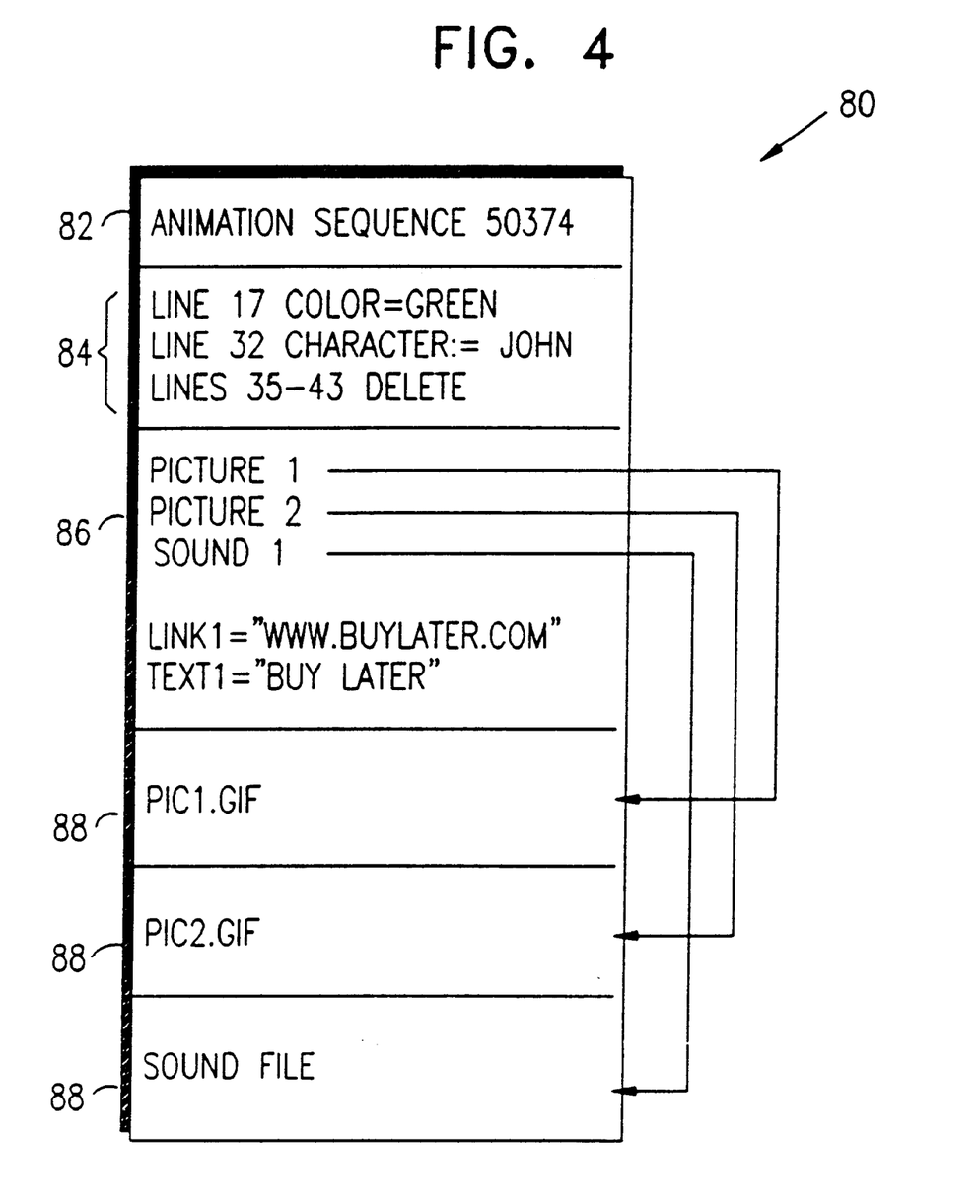
FIG. 4 is a schematic illustration of a Web page component description, in accordance with a preferred embodiment of the present invention.

FIG. 4 is a schematic illustration of a Web page component description 80 stored on server 26, in accordance with a preferred embodiment of the present invention. Description 80 comprises a reference 82 to the basic script chosen by the user. Preferably, description 80 includes a list 84 of changes made with respect to the basic script. Alternatively, reference 82 and list 84 are replaced by an actual copy of the script, and the changes from list 84 are entered into the script. Further alternatively, server 26 determines whether to store reference 82 or the actual copy of the script based on the complexity of the changes entered by the user. Description 80 preferably further comprises a list 86 of data entered by the user, such as links, text segments, pictures, and sound files, as described hereinabove. Preferably, list 86 includes pointers to data files 88 annexed at the end of description 88. Alternatively or additionally, the data is entered within list 86.

Figure 5:
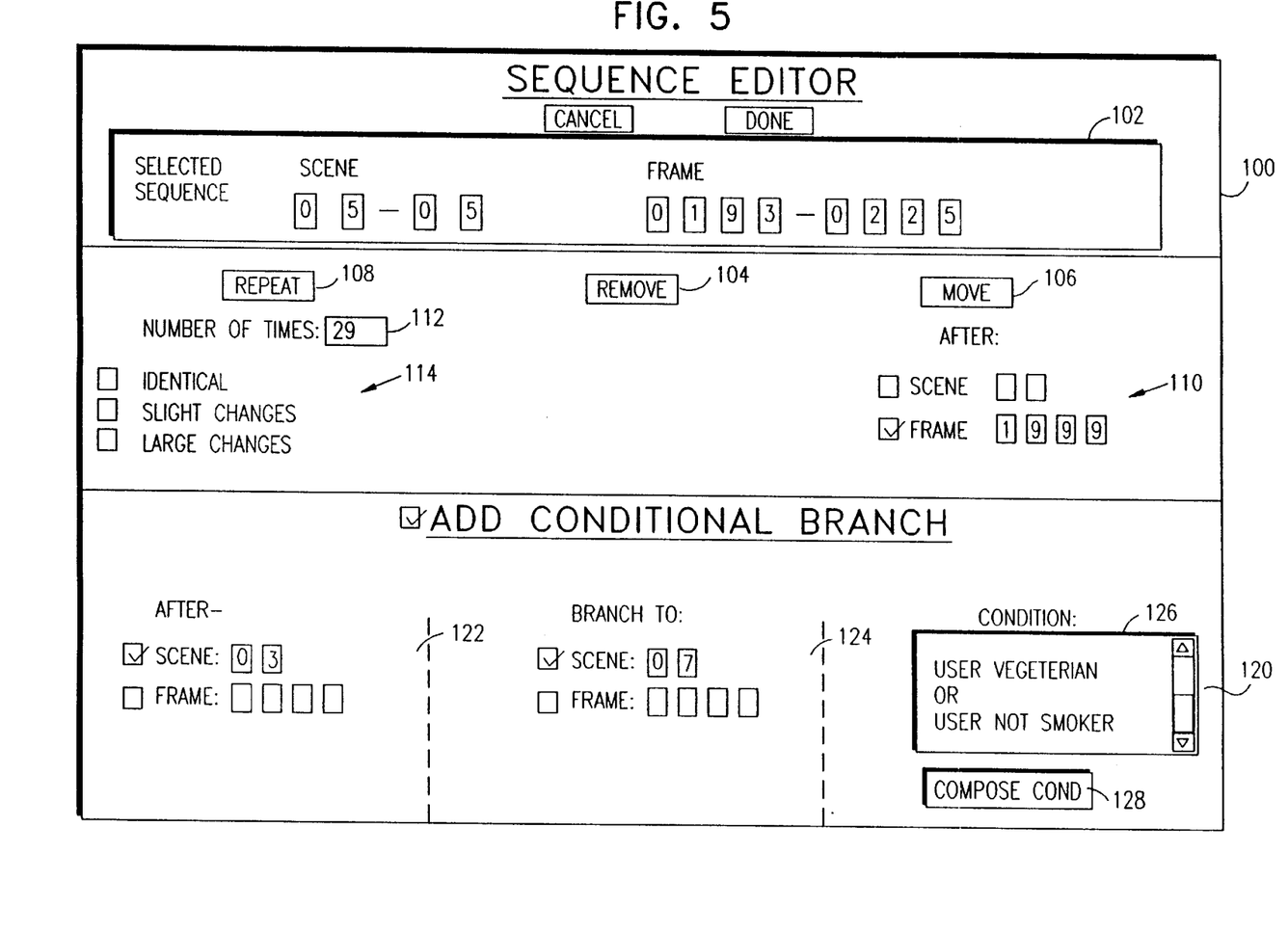
FIG. 5 is a schematic illustration of a sequence editor interface, in accordance with a preferred embodiment of the present invention.

FIG. 5 is a schematic illustration of an optional sequence editor interface 100, in accordance with a preferred embodiment of the present invention. The sequence editor is used to alter the animation sequence by removing and/or adding scenes, and/or by adding flow directives, such as conditional branches into the sequence.

Preferably, interface 100 includes a selection control 102, which is used to indicate a sub-sequence of the animation sequence that is to be manipulated by the editor. Preferably, selection control 102 allows the user to indicate the sub-sequence in terms of frames or scenes. Alternatively or additionally, the sub-sequence is defined in any other desired form. Preferably, when the sub-sequence is indicated in terms of scenes, interface 100 displays the frame numbers included in the scenes, so that the user may perform fine adjustment of the sub-sequence. Interface 100 preferably includes a plurality of controls 104, 106 and 108, which are used to manipulate the selected sub-sequence. Preferably, actuating control 104 deletes the sub-sequence from the animation sequence. Control 106 moves the selected sub-sequence to a different location in the animation sequence. Preferably, the new location is stated using an input field 110, in which the new location is stated either according to scenes or frames.

Preferably, server 26 determines the precise lines of the script which correspond to the selected sub-sequence. In some preferred embodiments of the present invention, window 100 allows selection only of sub-sequences which are represented by modular parts of the script. Alternatively or additionally, server 26 determines lines of the script which must be duplicated when the sub-sequence is moved to the new location. Preferably, deletions and/or movements of sub-sequences are indicated in list 84 in description 80. Alternatively, the deletions and/or movements are performed in the copy of the script.

Control 108 is preferably used to repeat the occurrence of the selected sub-sequence any desired number of times. A data entry window 112 is preferably used to enter the desired number of copies of the sub-sequence. Preferably, the user indicates in a check list 114 whether the repeated copies are to be identical, or whether the user plans to make changes, and to what extent. Accordingly, server 26 decides whether to repeat the sequence by inserting a "for-next" loop into the script, or by duplicating the lines of script corresponding to the selected sub-sequence.

Preferably, after the user operates control 104, 106 or 108, the animation sequence is immediately updated, and the frame numbers and/or scene numbers are re-allocated. Alternatively or additionally, the user may choose whether to re-allocate the frame and scene numbers or to assign a separate numbering scheme to newly added parts of the sequence. Preferably, the user is able to change the added parts of the sequence in the same way that the rest of the sequence is altered, as described hereinabove.

Preferably, interface 100 includes a command section 120 for adding conditional branch commands. Preferably, the user defines a scene after which the branch command is to be inserted in an input section 122. An additional branch destination section 124 is preferably used to input the destination of the branch command. The destination is preferably stated either in terms of scenes or in terms of frames. The condition of the branch is preferably shown in a display window 126 and is preferably altered using a condition editor interface, which is invoked by a condition control 128.

Preferably, other control commands may be added similarly to the animation sequence, such as sub-routine calls, loops, etc.

Figure 6:
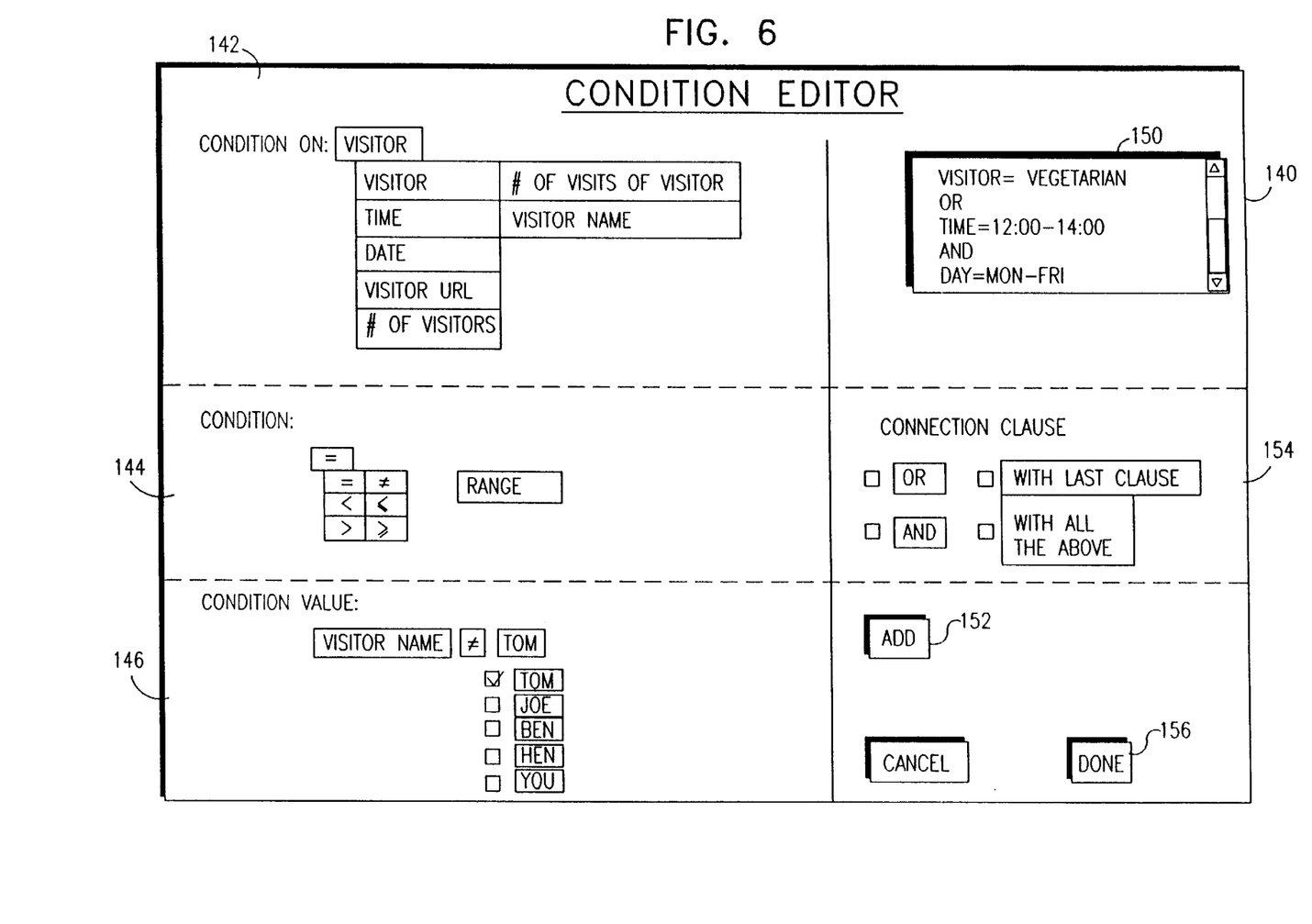
FIG. 6 is a schematic illustration of a condition editor interface, in accordance with a preferred embodiment of the present invention.

FIG. 6 is a schematic illustration of a condition editor interface 140, in accordance with a preferred embodiment of the present invention. Condition editor interface 140 preferably comprises a selection window 150, which shows the condition being prepared, on which the animation sequence is to branch. Preferably, the condition comprises one or more clauses connected by conjunction and/or disjunction operations.

Three sections 142, 144 and 146 of interface 140 are used to prepare the clauses of the condition. Section 142 is used to select a variable upon which the clause depends, section 144 is used to select a comparison condition to be applied to the variable, and section 146 is used to select a value against which the variable is compared to complete the condition clause. Preferably, the condition clause can be made dependent on any suitable variable for which information is available on the server which is to host the Web page which includes the condition. The variable may depend, for example, on the name of the visitor, the visitor's preferences and hobbies, the visitor's address, the number of times the visitor visited the page and the number of total visits in the page. Alternatively or additionally, the variable may depend on the time, date and/or day of the week of the visit or on whether other visitors have visited within a predetermined period. Further alternatively or additionally, the variable may depend on the type and capabilities of the browser being used by the visitor, which is determined by the server using methods known in the art. For example, if the server determines that the browser does not support Java, it may instead download a "gif" animation, rather than a Java applet.

The condition is preferably stated using the logical operators greater than, smaller than, and equal, and their inverses. Alternatively or additionally, the condition may be stated as a range, according to the nature of the variable. In any case, the allowed values of the variable are dependent on the nature of the variable. Preferably, section 146 lists possible values, and the user chooses the desired values. Alternatively or additionally, the user enters the desired values.

When a clause has been completely defined, the user adds the clause to the condition by actuating an add button 152. The clause is added to the condition shown in window 150 with a context operator (or, and) selected by the user in a section 154. Preferably, the user selects whether the context operator is applied between the new clause shown in section 146 and the most recent preceding clause, or between the new clause and all the previous clauses. To enter the condition, the user preferably actuates a "done" control 156.

Figure 7:
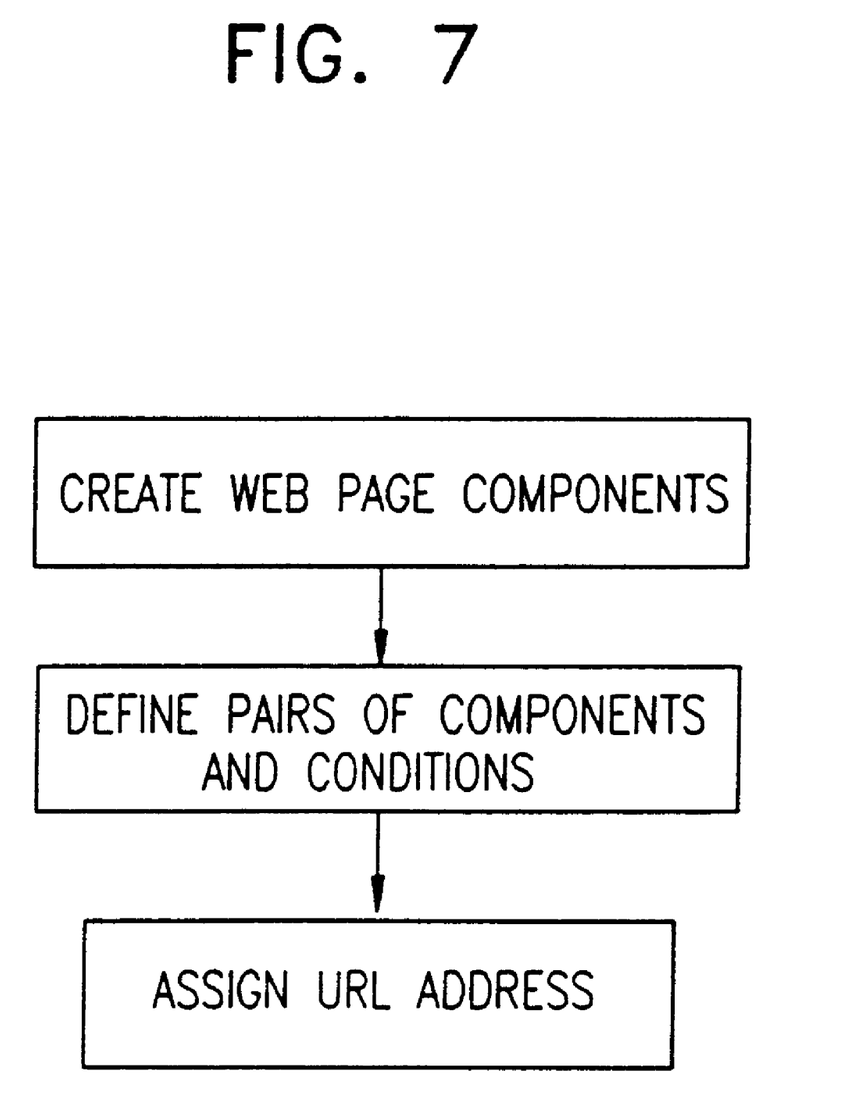
FIG. 7 is a flow chart schematically illustrating a method for preparing a dynamic Web page component, in accordance with a preferred embodiment of the present invention.

FIG. 7 is a flow chart that schematically illustrates the actions of a user of processor 20 in preparing a dynamic Web page component, in accordance with a preferred embodiment of the present invention. In the context of the present patent application and in the claims, a "dynamic page component" is a Web page component which has a single address but shows different displays according to input about the viewer and/or the circumstances in which the viewer accesses the page. Thus, a user may prepare a dynamic page component which changes according to the identity of the viewer, the time and date when the viewer accesses the page, and/or any other conditions. Preferably, the user creates a plurality of Web page components each of which is assigned a unique label. Preferably, the Web page components are prepared in accordance with the methods described hereinabove, although other suitable methods may also be used. Alternatively or additionally, the components are imported into server 26 from an external source. Further alternatively or additionally, one or more of the plurality of Web page components used to form the dynamic Web page are not actually situated on server 26 but are only referenced by their URL address. Preferably, the condition editor of FIG. 6 is used to determine which of various ones of the plurality of Web page component are to be presented under different predetermined conditions.

Figure 8:
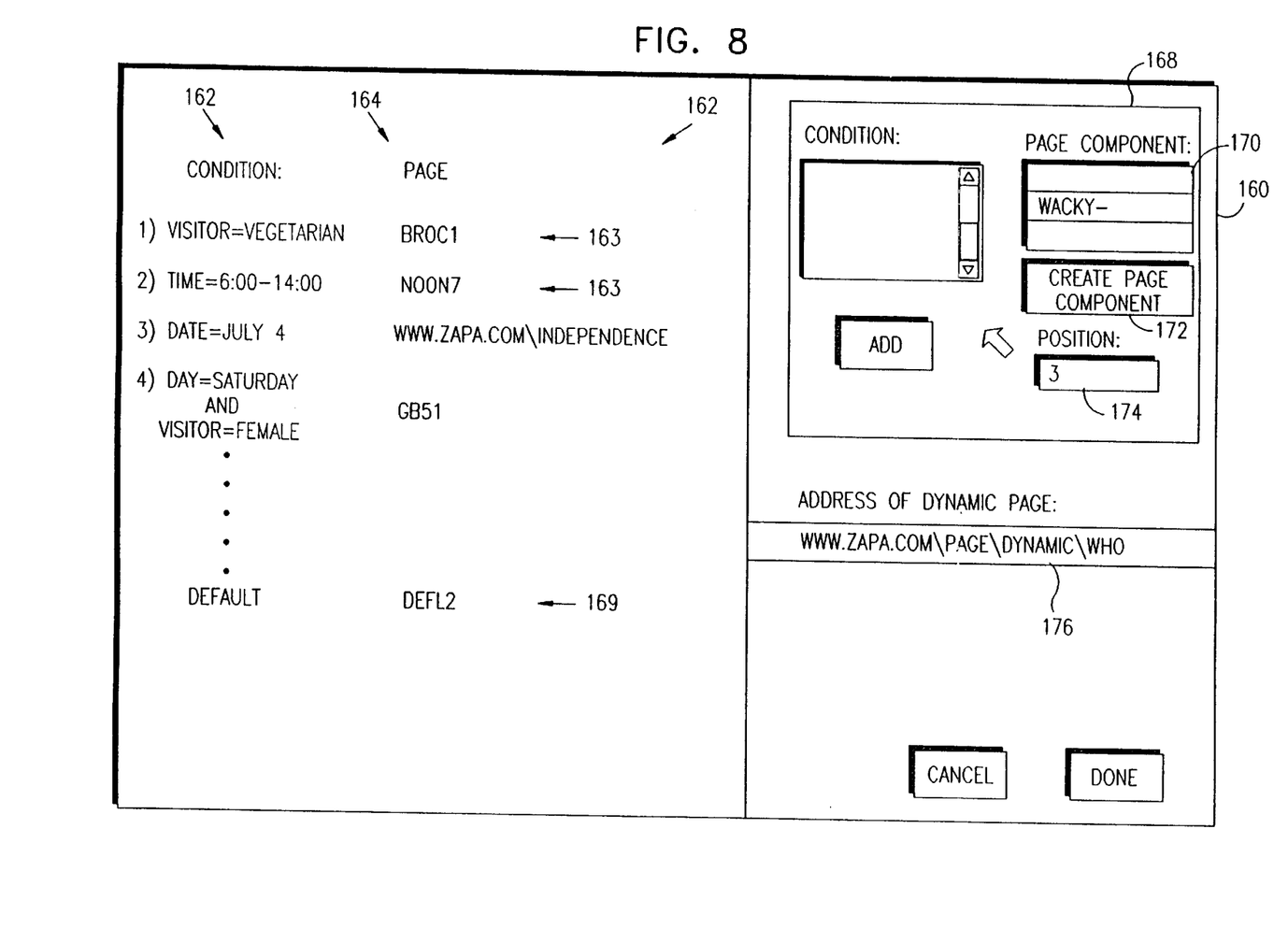
FIG. 8 is a schematic illustration of a dynamic component editor interface, in accordance with a preferred embodiment of the present invention.

Reference is also made to FIG. 8, which is a schematic illustration of an interface 160 to a dynamic page component editor, in accordance with a preferred embodiment of the present invention. Interface 160 displays, for a single URL address, a list 166 of pairs 163, each pair including a condition 162 and a page component identity 164 of a page component which is to be displayed if the condition is fulfilled. Preferably, a default page component 169 is defined for cases in which none of conditions 162 are fulfilled. Preferably, the user defines an order of precedence of pages 164 in case more than one of conditions 162 is fulfilled for a single visitor, most preferably according to the order of pages in list 166.

A frame 168 enables the user to add pairs 163 to list 166. Preferably, the user enters a condition 162 using the condition editor described above with respect to FIG. 6.

A page component field 170 allows the user to invoke a pre-created page by name. Alternatively or additionally, the user actuates control 172 which invokes a page component editor to create a new Web page component, for example, the page component editor described hereinabove. Further alternatively or additionally, the user may identify an external page component using a URL address. Preferably, a field 174 allows the user to specify the position of pair 163 in list 166, in accordance with the priority of the pair. Alternatively, methods of "drag and drop" editing may be used, as are known in the art, to create list 166.

A field 176 in interface 160 is preferably used to state the URL address of the dynamic page component. Preferably, the address is assigned to the user by server 26. Alternatively or additionally, the user can define the URL address of the dynamic page component.

The dynamic page component is then placed on a server, where it is accessible for viewing by visitors, as is known in the art. Preferably, the dynamic page component is located on a server which receives and stores information about some or all of the visitors to the page. The visitors may provide the information to the server when connecting for a first time to a home page on the server. At later times the visitor may be asked to provide a name or other identification when connecting to the server. Alternatively or additionally, the server determines the address and/or user name under which the visitor connects to the server.

When a visitor connects to the server and requests to view a dynamic page, the server determines which of the sequences included in the dynamic page component is to be displayed. Preferably, the server checks the conditions 162 in list 166 of the dynamic page component, and the page component displayed corresponds to the first condition 162 which is fulfilled. Information relative to the conditions may be obtained from the visitor using any suitable method known in the art. For example, the visitor may be prompted to enter a name and/or password, and possibly to answer further questions about his/her identity and preferences. The server may also record a "cookie" on the visitor's disk, as is known in the art, in order to identify the visitor and retrieve stored identification information during subsequent visits to the page.

As described hereinabove, the user of the Web site creates the dynamic Web page component by selecting elements and attributes to be applied to one of the basic animation sequences available at the site, such as that described in Table I. Typically, such sequences are created and supplied to the user by an operator of the Web site.

Figure 9:
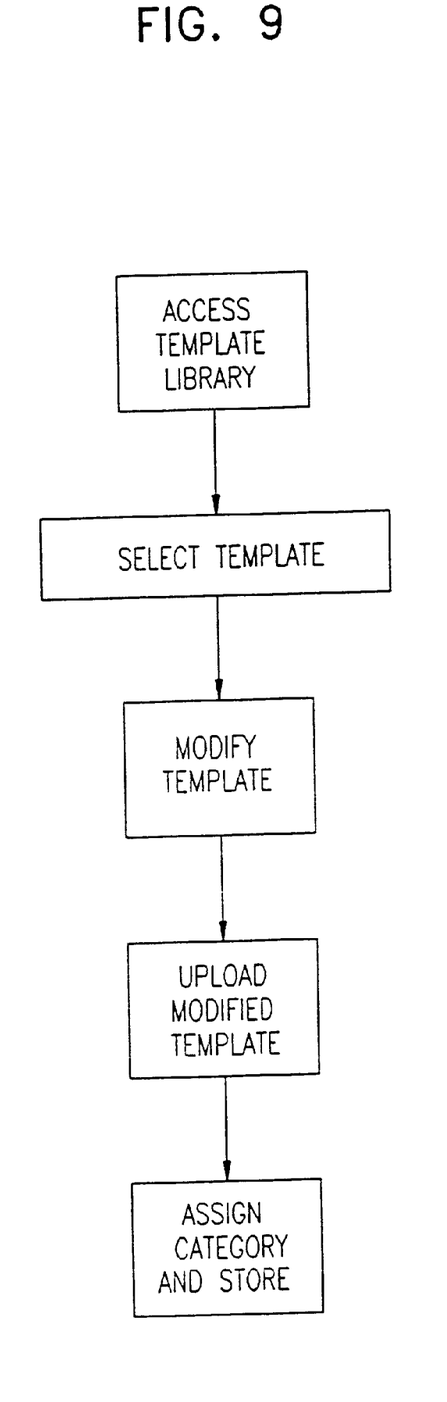
FIG. 9 is a flow chart that schematically illustrates a method for preparing a dynamic Web page template, in accordance with a preferred embodiment of the present invention.

FIG. 9 is a flow chart that schematically illustrates a method for creating templates for dynamic Web page components, in accordance with an alternative embodiment of the present invention. This method enable "power users" of the Web site to create their own basic animation sequences and, optionally, to post such sequences at the site, where they may be selected by other users. Preferably, the templates are created and modified using techniques described in the above-mentioned U.S. patent application Ser. No. 09/121,062.

The "power user" receives a software package which enables him or her to access a library of templates and select one of the templates to work on. The templates themselves comprise animation sequences, as described hereinabove and in U.S. patent application Ser. No. 09/121,062, with predefined placeholders embedded in them to receive objects for inclusion in the animation. The user can then modify the template by changing substantially all of its attributes other than the placeholders. For example, the user can insert completely new graphics, or can modify the motion path of one of the animated objects. These are changes that typically would not be available to users creating dynamic Web page components online, as described with reference to the preceding figures.

After creating the new template, the user can upload it to the Web site, where the template is stored under an appropriately-assigned category. Subsequently, online users are able to create their own new components based on the new template.

Those skilled in the art will appreciate that software for performing the functions described hereinabove can be sold and/or distributed on media, such as diskettes or CD-ROM, as well as in a medialess format via a network, for example. It will be appreciated generally that the preferred embodiments described above are cited by way of example, and the full scope of the invention is limited only by the claims.

What is claimed is:

1. A method for creating a Web page component, comprising:

opening a remote connection to a server provided with a plurality of basic animation sequences represented by corresponding files in a markup language held on the server, the sequences having variable attributes represented by placeholder tags in the markup language files;

choosing, via the connection, at least one of the basic animation sequences to be used in the Web page component;

changing one or more of the variable attributes of the chosen animation sequence by inputting, over the remote connection to the server, values to be assigned to the corresponding placeholder tags; and posting the Web page component including the animation sequence with the changed attributes to a Web page.

2. method according to claim 1, wherein opening the remote connection comprises opening a connection over the Internet.

3. A method according to claim 1, wherein choosing the at least one animation sequence comprises choosing an animation sequence which substantially covers an entire Web page.

4. A method according to claim 1, wherein changing one or more of the attributes of the animation sequence comprises inserting data into the animation sequence.

5. A method according to claim 4, wherein inserting data into the animation sequence comprises inserting images.

6. A method according to claim 4, wherein inserting data into the animation sequence comprises inserting hypertext links.

7. A method according to claim 1, wherein changing one or more of the attributes of the animation sequence comprises changing a color setting in the animation sequence.

8. A method according to claim 1, wherein changing one or more of the attributes of the animation sequence comprises changing a character which appears in the animation sequence.

9. A method according to claim 1, wherein the animation sequence comprises a plurality of frames in a predetermined order and wherein changing one or more of the attributes comprises manipulating the frames in the sequence.

10. A method according to claim 9, wherein manipulating the frames in the sequence comprises deleting one or more frames from the animation sequence.

11. A method according to claim 9, wherein manipulating the frames in the sequence comprises repeating one or more frames in the animation sequence.

12. A method according to claim 1, wherein changing one or more of the attributes of the animation sequence comprises assigning to at least one of the one or more attributes a plurality of values which are respectively chosen responsive to a condition evaluated when the Web page component is viewed.

13. A method according to claim 1, wherein changing one or more of the attributes of the animation sequence comprises adding conditional flow directives to the animation sequence.

14. A method according to claim 1, wherein posting the Web page component comprises posting a link to the animation sequence.

15. A method according to claim 13, wherein posting the Web page component comprises posting a list of the changes performed on the animation sequence.

16. A method according to claim 1, wherein posting the Web page component comprises posting a Web page component which does not require any proprietary software in order to be viewed by a viewer.

17. A method according to claim 1, wherein changing the one or more attributes does not require use of any proprietary software.

18. A method for creating a Web page component, comprising:
    providing a plurality of basic animation sequences represented by corresponding files in a markup language held on a server, the sequences having variable attributes represented by placeholder tags in the markup language files;
    receiving from a remote processor a selection of at least one of the basic animation sequences to be used in the Web page component;
    changing one or more of the attributes of the chosen animation sequence responsive to an input from the remote processor to the server of values to be assigned to the corresponding placeholder tags; and
    posting the Web page component including the animation sequence with the changed attributes to a Web page.

19. A method according to claim 18, wherein providing the plurality of basic animation sequences comprises receiving an animation template uploaded to the server by a user.

20. A method according to claim 18, wherein changing one or more of the attributes comprise s inserting data into the sequence.

21. A method according to claim 18, wherein changing one or more of the attributes of the animation sequence comprises changing a color setting in the animation sequence.

22. A method according to claim 18, wherein the animation sequence comprises a plurality of frames in a predetermined order and wherein changing one or more of the attributes comprises manipulating the frames in the sequence.

23. A method according to claim 18, wherein changing one or more of the attributes of the animation sequence comprises assigning to at least one of the one or more attributes a plurality of values which are respectively chosen responsive to a condition evaluated when the Web page component is viewed.

24. A method according to claim 18, wherein changing one or more of the attributes comprises adding conditional flow directives to the animation sequence.

25. A method according to claim 18, wherein posting the Web page component comprises posting a link to the animation sequence.

26. A method according to claim 25, wherein posting the Web page component comprises posting a list of the changes performed on the animation sequence.

27. A method according to claim 18, wherein posting the Web page component comprises posting a Web page component which does not require any proprietary software in order to be viewed by a viewer.

28. A method according to claim 18, wherein changing the one or more parameters does not require installing any proprietary software on the processor.

29. Apparatus for creating a Web page component, comprising:
    a server which displays a plurality of basic animation sequences represented by corresponding files in a markup language held on the server, the sequences having variable attributes represented by placeholder tags in the markup language files, and which allows a user of a remote processor to select at least one basic animation sequence and change one or more of the variable attributes of the sequence by inputting values to be assigned to the corresponding placeholder tags; and
    a communication interface which receives a connection from the remote processor to the server, whereby the user thereof selects the sequence and inputs the values to be assigned to the placeholder tags.

30. Apparatus according to claim 29, wherein the at least one basic animation sequence covers an entire Web page.

31. Apparatus according to claim 29, wherein the one or more attributes comprise colors associated with the sequence.

32. Apparatus according to claim 29, wherein the server allows addition of data into the sequence by the user.

33. Apparatus according to claim 29, wherein the animation sequence includes a plurality of frames, and the server allows the user to manipulate the frames.

34. Apparatus according to claim 33, wherein the server allows the user to delete frames.

35. Apparatus according to claim 33, wherein the server allows the user to duplicate frames.

36. Apparatus according to claim 29, wherein the server assigns a plurality of values to the one or more attributes together with a scheme which determines which of the values is to be used each time the Web page component is displayed.

37. Apparatus according to claim 29, wherein the server adds a conditional flow directive to the sequence responsive to a command from the user.

38. Apparatus according to claim 29, wherein the server allows the user to select and change the sequence using substantially only non-proprietary software.

39. A software package for creating Web page components, comprising an executable file on a machine readable medium which is run by a server having a communication interface adapted to receive a connection from a remote processor, such that running the file causes the server to display on a Web page a selected basic animation sequence from among a plurality of basic animation sequences represented by corresponding files in a markup language held on the server and having variable attributes represented by placeholder tags in the markup language files, responsive to selection of the sequence by a user of the remote processor via the connection, and causes the server to allow the user to change one or more of the variable attributes of the selected sequence by inputting values to the server via the connection to be assigned to the corresponding placeholder tags.

40. A software package according to claim 39, wherein the variable attributes comprise one or more attributes selected from a group of attributes that includes colors, characters, pictures, texts, links, and sound files.

41. A software package according to claim 39, and comprising a plurality of data files which include data representative of the basic animation sequences.

42. A software package according to claim 41, wherein the executable file performs changes to the animation sequence by changing a copy of a respective one of the data files.

43. A software package according to claim 41, wherein the executable file performs changes to the animation sequence by associating a list of changes with a pointer to a respective one of the data files.

* * * * *